United States Patent [19]

Sato et al.

[11] Patent Number: 5,228,720
[45] Date of Patent: Jul. 20, 1993

[54] COUPLER OF COLLAPSIBLE SHAFT FOR STEERING DEVICE

[75] Inventors: Kenji Sato; Mitsuo Ichikawa, both of Maebashi, Japan

[73] Assignee: Nippon Seiko Kabushiki Kaisha, Tokyo, Japan

[21] Appl. No.: 720,365

[22] Filed: Jun. 25, 1991

[30] Foreign Application Priority Data

Jul. 5, 1990 [JP] Japan ............................ 2-71056[U]

[51] Int. Cl.⁵ ............................................. B62D 1/19
[52] U.S. Cl. ................................... 280/777; 74/492; 403/359
[58] Field of Search ............... 280/777, 779; 74/492; 403/225, 359, 298, 372, 357, 383

[56] References Cited

U.S. PATENT DOCUMENTS

| | | | |
|---|---|---|---|
| 2,838,270 | 6/1958 | Danielson | 403/359 |
| 3,990,013 | 11/1976 | Badger | 403/359 |
| 4,098,096 | 7/1978 | Chard et al. | 403/359 |

FOREIGN PATENT DOCUMENTS 63-104280 7/1988 Japan.
64-45576 3/1989 Japan.

Primary Examiner—Margaret A. Focarino
Assistant Examiner—Paul Dickson
Attorney, Agent, or Firm—Shapiro and Shapiro

[57] ABSTRACT

A coupler of a collapsible shaft for a steering device comprises a shaft member having a male serration formed at an end of an outer periphery thereof; a tube member having a female serration for engaging with the male serration groove formed at at least an end of an inner periphery thereof; synthetic resin intervened between the shaft member and the tube member in order to axially secure the shaft member and the tube member coupled through the engagement of the male serration and the female serration. Through-holes are formed at a plurality of positions around a circumference at the end of the tube member and a concave groove is formed around an entire circumference at the end of the outer periphery of the shaft member. A plurality of ribs are formed around a circumference on the bottom of the concave groove, and the synthetic resin filled into the groove through the through-hole is solidified between the female serration and the ribs.

2 Claims, 2 Drawing Sheets

COUPLER OF COLLAPSIBLE SHAFT FOR STEERING DEVICE

BACKGROUND OF THE INVENTION

1. Field of the Invention

The present invention relates to a coupler of a collapsible intermediate shaft or steering shaft of a steering device.

2. Related Background Art

A steering device of an automobile is constructed as shown in FIG. 5.

Numeral 1 denotes a steering wheel. The movement of the steering wheel 1 is transmitted to a steering gear 4 through a steering shaft (not shown) inserted into a steering column 2, and wheels are steered by the steering gear 4.

Since the steering shaft and an input shaft 5 of the steering gear 4 cannot usually be arranged on the same line, an intermediate shaft 3 is provided between the steering shaft and the input shaft 5, and the opposite ends of the intermediate shaft 3 and the end of the input shaft 5 are coupled by universal joints 6 so that the movement can be transmitted between the steering shaft and the input shaft 5 which are not on the same line.

In such a steering device of the automobile, in order to protect the driver in a collision, it is a usual practice to use a collapsible shaft which collapses lengthwise when an impact is applied thereto, as the steering shaft or intermediate shaft 3.

FIG. 6 shows a prior art construction which uses a collapsible shaft as the intermediate shaft 3.

The intermediate shaft 3 is constructed by coupling a shaft member 7 and a tube member 8 by synthetic resin 9.

A male serration 10 is formed on an outer periphery of an end of the shaft member 7, and a female serration 11 which is to engage with the male serration 10 is formed on an inner periphery of an end of the tube member 8. A pair of through-holes 12 are formed at the end of the tube member 8 at diametrically opposing positions, and a concave groove 13 is formed on the outer periphery of the end of the shaft member 7 around the entire circumference. The synthetic resin 9 filled in the groove 13 through one of the pair of through-holes 12 is driven into a small clearance between the male serration 10 and the female serration 11 to prevent play between the male serration 10 and the female serration 11 when the intermediate shaft 3 is rotated.

A yoke 14 of a universal joint is fixed to the end of the shaft member 7 by a bolt and a nut (not shown) and a yoke 15 of the universal joint is fixed to the end of the tube member 8 by welding.

As noted earlier, the synthetic resin 9 filled into the recessed groove 13 through the one through-hole 12 is driven into the fine clearance between the male serration 10 and the female serration 11 to prevent play therebetween. However, if the precision of the components is not strictly defined, a sufficient amount of synthetic resin 9 may not be driven into the clearance between the serrations 10 and 11 due to the manufacturing tolerance of the components. In the prior art construction, the manufacturing cost of the collapsible shaft increases due to the precision of the components required to prevent the above problem.

Japanese Utility Model Laid-Open Application No. 63-104280 discloses a structure in which a concave portion is formed on the outer periphery of the male serration 10 so that a relatively large amount of synthetic resin is driven into the clearance between the concave portion and the female serration. However, the manufacturing cost of the collapsible shaft is still high because the machining of the concave portion takes a long time and the abrasion of a tool (end mill) to form the concave portion is rapid.

Japanese Utility Model Laid-Open Application No. 64-45576 discloses a structure in which a through-hole having the opposite ends thereof extended to the male serration is formed diametrically of the end of the shaft member, and the synthetic resin is filled in the through-hole. However, the manufacturing cost of the collapsible shaft is again high because the machining is troublesome and time-consuming and the abrasion of a tool (drill) for forming the through-hole is rapid.

SUMMARY OF THE INVENTION

It is an object of the present invention to provide a coupler of a collapsible shaft for a steering device which requires a low manufacturing cost and does not cause play in the coupler over an extended period.

Like the prior art coupler, the coupler of the collapsible shaft for the steering device of the present invention comprises a shaft member having a male serration formed at an end of an outer periphery thereof; a tube member having a female serration for engaging with the male serration formed at at least an end of an inner periphery thereof; and synthetic resin intervened between the shaft member and the tube member in order to non-separably connect the shaft member and the tube member coupled through the engagement of the male serration and the female serration.

Through-holes are formed at a plurality of positions around a circumference at the end of the tube member and a concave groove is formed around an entire circumference at the end of the outer periphery of the shaft member.

Further, in accordance with the coupler of the collapsible shaft for the steering device of the present invention, a plurality of ribs are formed around a circumference on the bottom of the concave groove, and the synthetic resin filled into the recessed groove through the through-hole is solidified between the female serration and the ribs.

In accordance with the coupler of the collapsible shaft for the steering device of the present invention, the play between the serration engagements of the shaft member and the tube member is prevented by the synthetic resin filled into the concave groove and solidified between the female serration and the ribs.

DETAILED DESCRIPTION OF THE PREFERRED EMBODIMENTS

Figure 1:
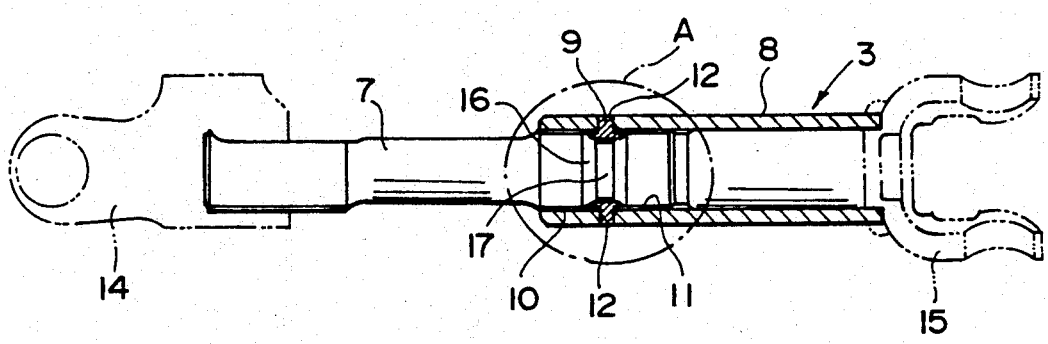
FIG. 1 shows a sectional view of an overall construction of the first embodiment.
Figure 2:
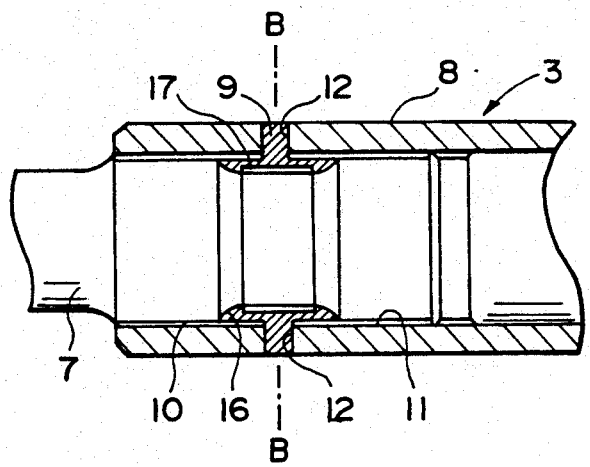
FIG. 2 shows an enlarged view of a portion A of FIG. 1.
Figure 3:
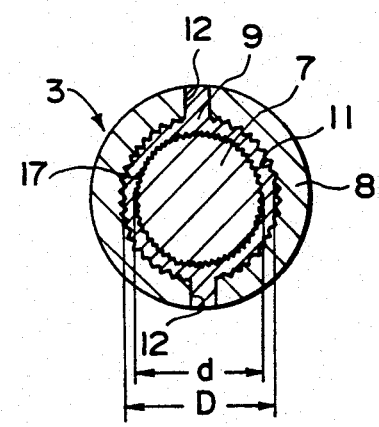
FIG. 3 shows a sectional view along line B—B of FIG. 2.

An intermediate shaft 3 in the embodiment of FIGS. 1-3 comprises a shaft member 7 and a tube member 8 coupled by synthetic resin 9. A yoke 14 of a universal joint is fixed to an end of the shaft member 7 and a yoke 15 of the universal joint is fixed to an end of the tube member 8, by bolts and nuts or welding.

A male serration 10 is formed on the outer periphery at the end of the shaft member 7, and a female serration 11 which is to engage with the male serration 10 is formed on the inner periphery at the end of the tube member 8. A pair of through-holes 12 are formed at the end of the tube member 8 at diametrically opposing positions and a concave groove 16 is formed in the outer periphery of the end of the shaft member 7 to extend around the entire circumference.

Figure 6:
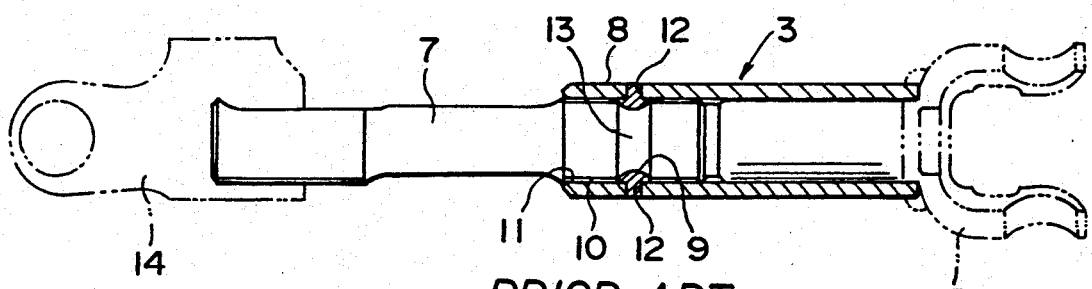
FIG. 6 shows an overall construction of a prior art collapsible shaft.

In the coupler of the present invention, the groove 16 formed on the outer periphery at the end of the shaft member 7 is wider than the groove 13 (FIG. 6) formed in the outer periphery of the end of the shaft member 7 in the prior art coupler.

A plurality of ribs 17 which extend axially are formed at an intermediate portion on the bottom of the wide groove 16, and synthetic resin 9 filled into the groove 16 through one of the pair of through-holes 12 is solidified in a clearance between the female serration 11 formed on the inner periphery of the tube member 8 and the ribs 17 formed at the intermediate portion of the concaved groove 16 on the outer periphery of the shaft member 7, as shown in FIGS. 2 and 3. A diameter D of an inscribed circle of the female serration 11 is larger than a diameter d of a circumscribed circle of the ribs 17 so that the synthetic resin 19 filled into the concave groove 16 through the one through-hole 12 is completely filled over the entire circumference.

In the intermediate shaft 3 having the coupler of the collapsible shaft for the steering device of the present invention, the play between the serration engagements of the shaft member 7 and the tube member 8 is prevented by the synthetic resin which is filled into the concave groove 16 and solidified between the female serration 11 and the ribs 17.

The filling of the synthetic resin into the groove 16 is carried out without regard to the manufacturing tolerances of the components, and the amount of the synthetic resin 9 filled is larger than the amount of the synthetic resin driven into the fine clearance between the male serration 10 and the female serration 11 in the prior art construction, and the synthetic resin 9 is not relatively rapidly fatigued because of a certain degree of elastic deformation. Accordingly, the play between the serrations 10 and 11 can be effectively prevented over the extended period and uncomfortable feeling to a driver is avoided.

The formation of the ribs 17 at the intermediate portion of the concave groove 16 may be done by knurling or by forming it simultaneously with the rolling formation of the male serration 10 without increasing the manufacturing cost.

When an axially inward force is applied to the intermediate shaft 3 in a collision, the synthetic resin 9 is broken between the through-holes 12 and the concave groove 16 and the total length of the intermediate shaft 3 is reduced while the male serration 10 and the female serration 11 engage.

Figure 4:
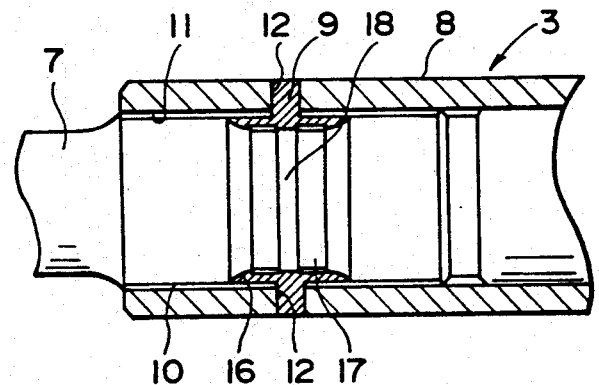
FIG. 4 shows a second embodiment of the present invention.
Figure 5:
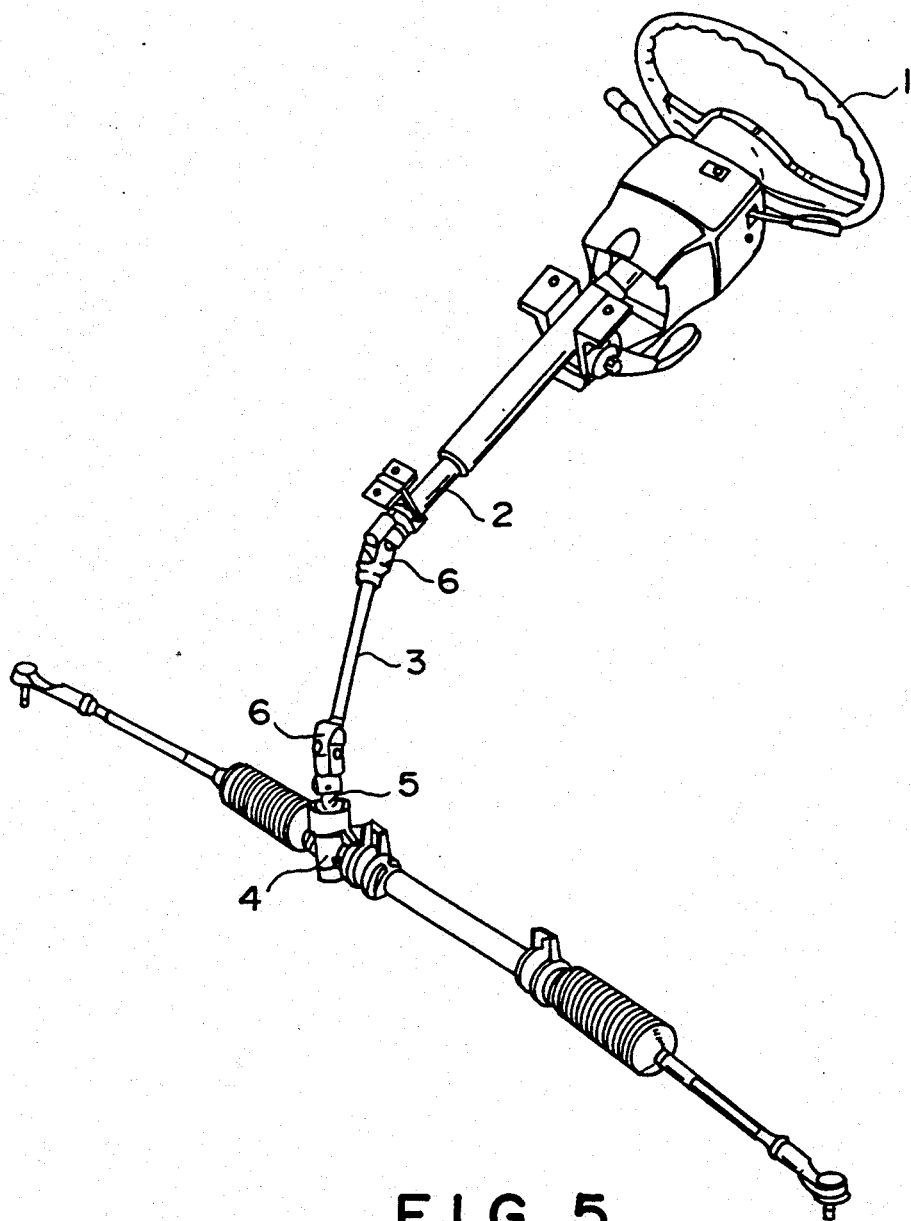
FIG. 5 shows a perspective view of a steering device having a collapsible shaft assembled therein.

A second embodiment of the present invention is shown in FIG. 4.

In the present embodiment, a groove 18 is formed around an entire circumference of an intermediate portion of the ribs 17 formed around the entire circumference of the intermediate portion of the wide concave groove 16.

The synthetic resin 9 filled into the groove 16 through one of the pair of through-holes 12 is driven to the entire circumference of the groove 16 through the groove 18.

The other construction and operation are identical to those of the first embodiment.

The coupler of the collapsible shaft for the steering device of the present invention has a longer durability than that of the prior art coupler and enables the manufacturing of the collapsible shaft which does not cause play over the extended period, with simple machining and low cost.

What is claimed is:

1. A coupler of a collapsible steering shaft of a vehicular steering device, comprising a shaft member having a male serration formed at an end portion of an outer periphery thereof, a tube member having a female serration formed at an end portion of an inner periphery thereof and meshed with said male serration, through-holes formed at a plurality of positions around a circumference of said end portion of said tube member, a concave groove, including a bottom, formed around an entire circumference of the outer periphery of said end portion of said shaft member, a plurality of longitudinally extending ribs formed at spaced positions on said circumference on said bottom of said groove, and synthetic resin having been filled into said groove through at least one said through-hole and solidified so as to axially secure said shaft member and said tube member to each other, with the synthetic resin filling a clearance between the female serration and said ribs.

2. A coupler according to claim 1, including a second plurality of longitudinally extending ribs formed on said circumference on said bottom of said groove and axially separated from the first-mentioned ribs by an intervening groove portion.

* * * * *